UNITED STATES PATENT OFFICE 2,407,673

PROCESS FOR THE SYNTHESIS OF 1-KETO-8-METHYLHEXAHYDROINDANOL-1

Nicholas A. Milas, Belmont, Mass., assignor to Research Corporation, New York, N. Y., a corporation of New York No Drawing. Application June 20, 1941, Serial No. 399,041

8 Claims. (Cl. 260—468)

In the synthesis of the antirachitic vitamins as well as in the synthesis of sex hormones the keto-alcohol (Compound I) constitutes an important intermediate product. The present invention deals with a new process for the synthesis of this compound.

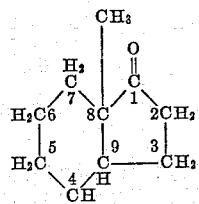

Compound I

The process makes use of the well known compound 2-methyl-2-carboethoxy cyclohexanone-1, Compound II. Upon treatment with bromine or chlorine, Compound III results in excellent yields. Compound III is converted into an alkoxy or aryloxy derivative thereof by treatment with a metallic or metallo derivative of an alcohol or phenol. I have chosen sodium phenolate for this purpose because the phenoxy Compound IV is crystalline and easy to purify. The above described reactions are shown by the following equations in which, for convenience, bromine is shown as a representative halogen.

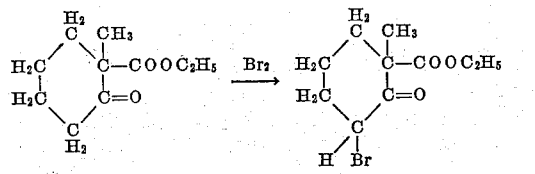

Compound II   Compound III

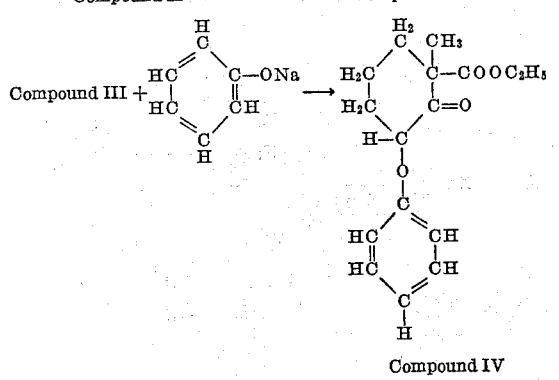

Compound IV

When Compound IV is heated with β-chloro or brom-ethylpropionate in the presence of magnesium amalgam or metallic magnesium in an inert solvent, the Compound V is formed as follows:

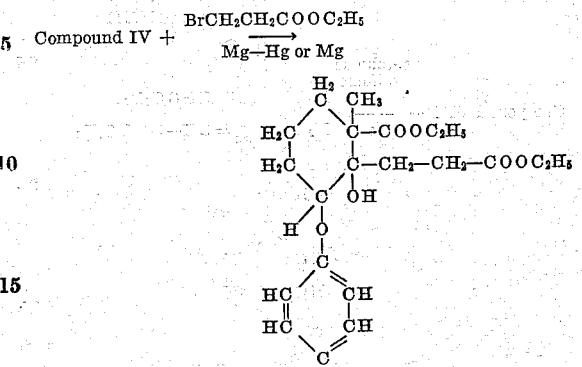

Compound V

Compound V is dehydrated by heating it in an inert solvent in the presence of small amounts of iodine or p-toluene sulfonic acid to give Compound VI which is hydrogenated in the presence of nickel or platinum catalysts to form Compound VII as follows:

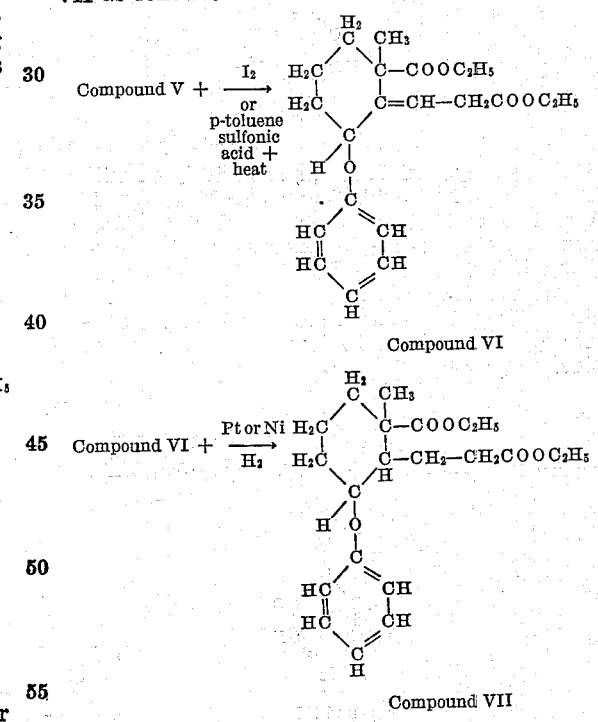

Compound VI

Compound VII

Compound VII may also be made by another route through the well known Reformatsky reaction. When Compound IV is treated with ethylbromo acetate in the presence of zinc dust or wool, the Compound VIII results in good yields. This is dehydrated by distilling in the presence of small amounts of iodine or p-toluene sulfonic acid to yield Compound IX which is hydrogenated to Compound X as follows:

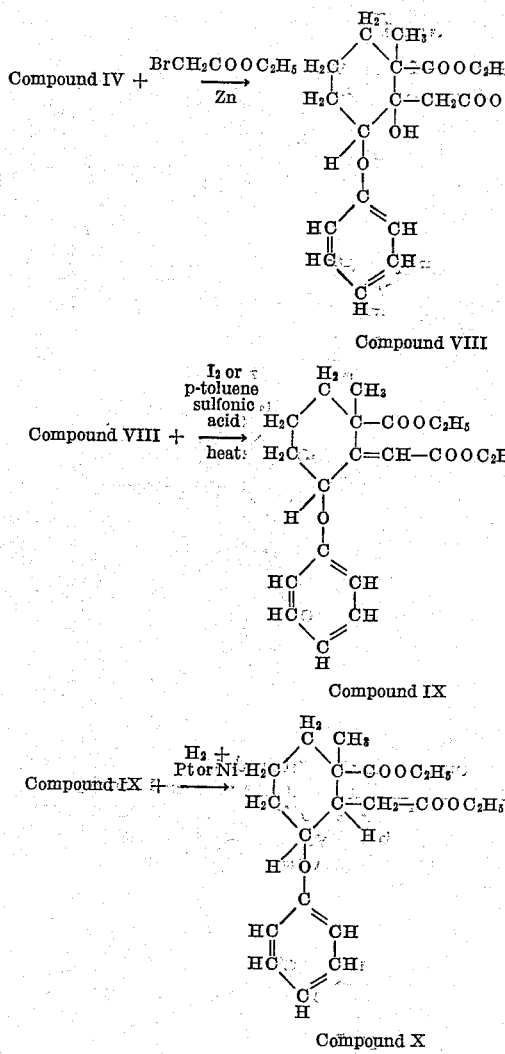

When Compound X is partly hydrolyzed with dilute sodium hydroxide Compound XI is formed which is converted into the acid chloride XII by gently heating with phosphorus trichloride or thionyl chloride. Compound XII is converted to Compound XIII by means of the well known reaction of diazo methane, and the latter is converted to Compound XIV by reaction with silver oxide.

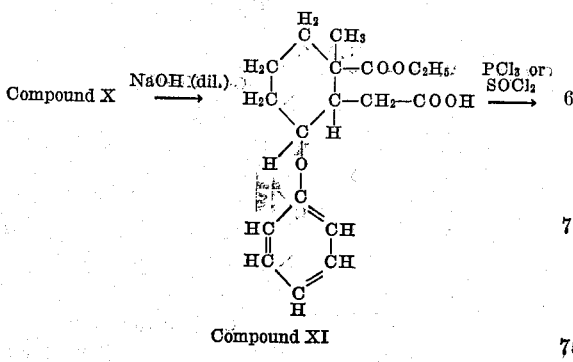

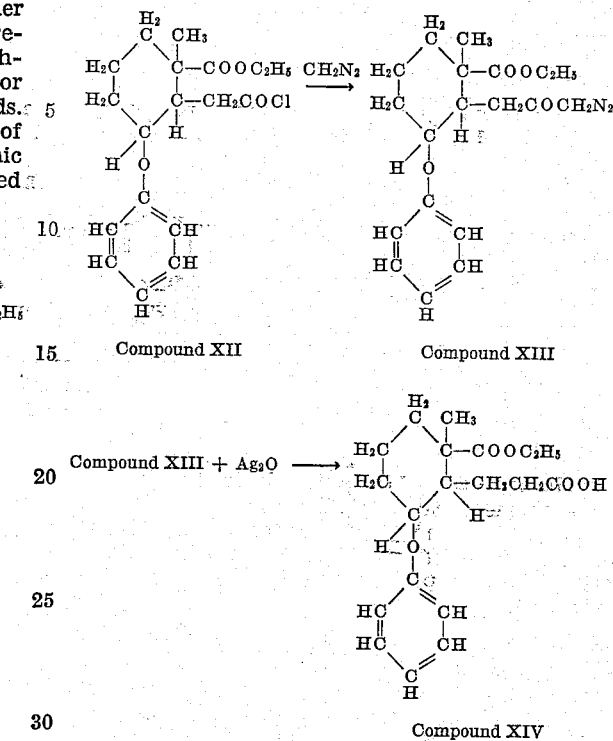

Compound XIV is then esterified and the diester Compound VII cyclized by means of metallic sodium or sodium alcoholate to Compound XV as follows:

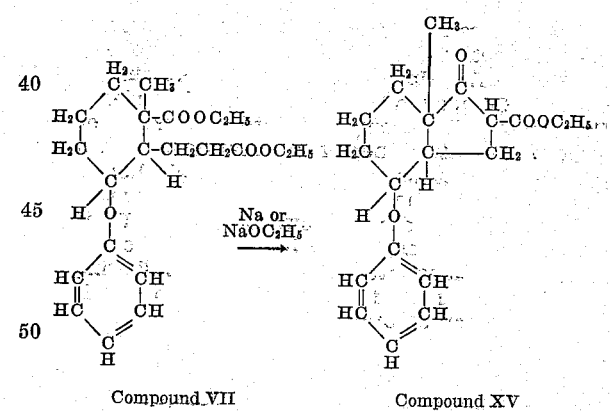

When Compound XV is saponified with alcoholic potash, acidified and the acid heated, it decarboxylates to give Compound XVI which, when hydrolyzed with hydriodic acid, gives Compound I.

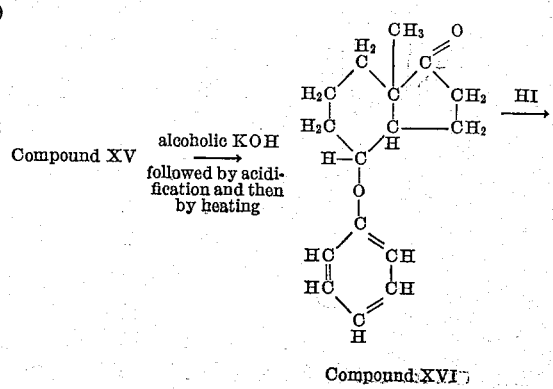

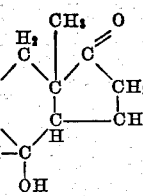

Compound I

To make the intermediate ketone XXI of vitamin D, Compound XVI is treated with the Grignard of 2-bromo-6-methyl heptane to give Compound XVII which is dehydrated through the action of thionyl chloride in the presence of pyridine or merely by heating in an inert solvent with p-toluene sulfonic acid to give Compound XVIII which is hydrogenated catalytically to Compound XIX. Compound XIX is then hydrolyzed with hydriodic acid to give Compound XX which can be oxidized with chromic acid or other oxidizing agents to the ketone Compound XXI.

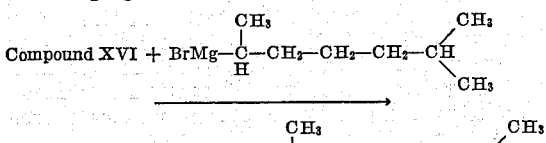

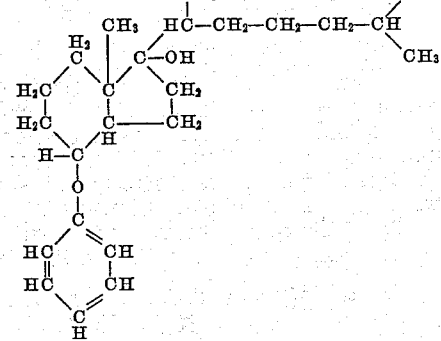

Compound XVII

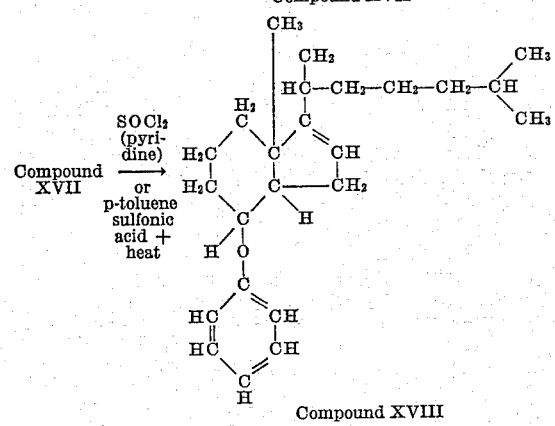

Compound XVIII

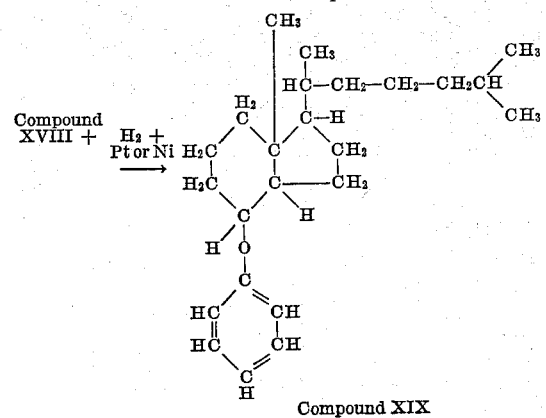

Compound XIX

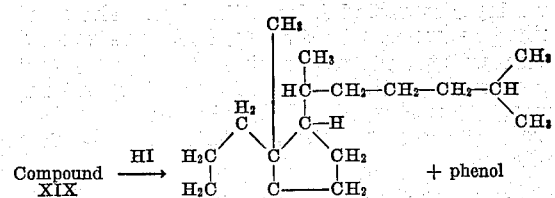

Compound XX

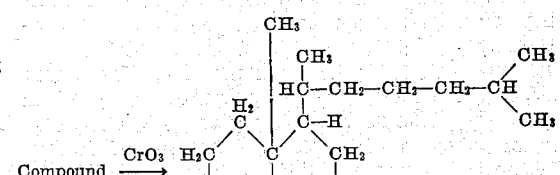

Compound XXI

A more detailed account of the principal reactions of the process is given hereinafter.

*Synthesis of 2-methyl-2-carboethoxy-6-bromo cyclohexanone-1—Compound III*

Into a well stirred mixture of 100 g. of 2-methyl-2-carboethoxy cyclohexanone-1 and 50 cc. of olefin-free petroleum ether was added dropwise 96 g. of bromine in the course of one hour, while nitrogen was passed through the mixture to sweep out the hydrobromic acid formed. Stirring was continued for one-half hour longer. The mixture was then fractionated under reduced pressure and the fraction boiling at 127–128° (2 mm.) collected and allowed to stand at 0° overnight. This crystallized into a solid which upon recrystallization from petroleum ether had the M. P. of 50–51°; yield, 110 g. In subsequent preparation the distillation was omitted and crystals were obtained by seeding the mother liquor after the solvent had been removed.

*Synthesis of 2-methyl-2-carboethoxy-6-chloro cyclohexanone-1—Compound III*

A mixture of 30 g. of 2-methyl-2-carboethoxy cyclohexanone-1 and 30 cc. of olefin-free petroleum ether was placed in a 500 cc. three-necked flask fitted with a mechanical stirrer, reflux condenser and a gas inlet. Chlorine gas was passed into the mixture for one and three-quarters hours, then the mixture was poured into water and the ether layer separated. The ether layer was washed three times with water, twice with sodium bicarbonate solution and twice again with water. After drying and removal of the ether, the chloroketone crystallized from alcohol in colorless prisms.

*Synthesis of 2-methyl-2-carboethoxy-6-phenoxy cyclohexanone-1—Compound IV*

Sodium phenolate (.21 mol) was made by refluxing a well stirred mixture of 20 g. of phenol in 50 cc. of benzene and 4.37 g. (0.19 mol) of metallic sodium. When all of the sodium was used up and the mixture cooled to room temperature, 50 g. (0.19 mol) of 2-methyl-2-carboethoxy-6-bromo cyclohexanone-1, Compound III, dissolved in 100 cc. of dry benzene was added and the mixture heated for four hours on the steam bath. The mixture was then poured into dilute acetic acid, the benzene layer separated and the aqueous layer extracted twice with ether. The combined benzene and ether extracts were washed with water and with sodium bicarbonate and once again with water. After drying and removal of solvent, the phenoxy ketone crystallized from benzene-petroleum ether in colorless prisms.

Synthesis of 1-hydroxy-2-methyl-2-carboethoxy-6-phenoxy cyclohexanone-1-propionic ethyl-ester—Compound V Compound V has been synthesized by refluxing for 24 hours a mixture of β-bromoethylpropionate (100% excess) and 2-methyl-2-carboethoxy-6-phenoxy cyclohexanone-1, Compound IV, with excess freshly prepared magnesium turnings. The reaction is activated in the usual manner by adding small amounts of iodine. When the mixture is worked up a product is obtained which analyzes for Compound V.

Synthesis of 2-methyl-2-carboethoxy-6-phenoxy cyclohexylidene ethylpropionate—Compound VI This product is easily prepared from Compound V by simply heating it with small amounts of iodine or anhydrous p-toluene sulfonic acid in an inert solvent such as toluene and distilling the water formed. An alternative method for the preparation of Compound VI consists in treating Compound V with thionyl chloride in pyridine whereby the chloride is formed and hydrogen chloride removed by the same operation.

Synthesis of 2-methyl-2-carboethoxy-6-phenoxy cyclohexanone-1-ethylpropionate—Compound VII Compound VII is easily prepared by catalytic hydrogenation in an alcoholic or glacial acetic acid solution in the presence of platinum or nickel catalysts either in an atmosphere of hydrogen or under several atmospheres of hydrogen pressure.

Synthesis of 1-hydroxy-2-methyl-2-carboethoxy-6-phenoxy cyclohexanone-1-ethylacetate—Compound VIII Compound VII may also be prepared by an alternative route from Compound IV via Compounds VIII, IX, X, XI, XII, XIII and XIV and esterification of the latter as outlined above. Compound VIII has been prepared as follows: Two g. of 2-methyl-2-carboethoxy-6-phenoxy cyclohexanone-1, Compound IV, was added to a mixture of 5 g. of amalgamated zinc (20 mesh, cleansed with dilute hydrochloric acid, washed with acetone and dried), 0.05 g. of iodine and 1.55 cc. of ethyl bromoacetate in 20 cc. of dry benzene and 20 cc. of dry ether. After the iodine color had disappeared and a yellow complex started to form, further additions of zinc and iodine were made every half hour for two hours, and 1.5 cc. of ethyl bromoacetate was added at the end of this time. The reaction mixture was then refluxed for two hours longer, the complex dissolved in a mixture of ethanol and acetic acid and hydrolyzed with dilute acetic acid. The benzene-ether layer was then separated and the water layer extracted once more with benzene. The combined non-aqueous extracts were washed several times with dilute ammonium hydroxide, then with water and dried over anhydrous magnesium sulfate. When the solvent was removed, the hydroxy ester crystallized from alcohol in colorless needles; yield, 0.9 g. (34%); M. P. 54.5–59°. After two recrystallizations from alcohol a constant M. P. of 60–61.5° was obtained.

Compounds IX and X are prepared from Compounds VIII and IX, respectively, by exactly the same operations as those used for the preparations of Compounds VI and VII from Compounds V and VI, respectively, and descriptions of these procedures need not, therefore, be repeated.

To prepare Compound XI, Compound X is suspended in dilute (about 0.1 N) sodium hydroxide and heated gently. Since there is a difference in the rate of hydrolysis of the two ester groups, the acetoxy is more easily hydrolyzed than the carboethoxy, and its sodium salt is easily removed from the unconverted neutral ester. The salt is decomposed with dilute hydrochloric acid whereby Compound XI is obtained and purified by recrystallization from alcohol.

Synthesis of the acid chloride—Compound XII

When Compound XI is heated on the water bath with about 20% excess thionyl chloride or phosphorus trichloride, Compound XII is formed which can be purified by high vacuum fractionation or by recrystallization from benzene petroleum ether or acetone.

Synthesis of Compounds XIII and XIV

In this synthesis, diazomethane is mixed in excess with the acid chloride Compound XII and the mixture allowed to stand at room temperature for some time. Without separation the product may be treated directly with silver oxide whereby Compound XIV is formed in fairly good yields. This compound is then esterified in the usual manner to give the diester, Compound VII.

Cyclization of Compound VII to produce the ketone Compound XV

About 0.5 g. of metallic sodium is added to about 100 cc. of dry toluene and the mixture stirred vigorously and heated to the boiling point of the solvent. To this mixture is then added about 36.2 g. (0.1 mol) of 2-methyl-2-carboethoxy-6-phenoxy cyclohexanone-1-ethylpropionate, Compound VII, and heating continued for several hours. The reaction mixture is then cooled and poured into dilute acetic acid. The toluene layer is separated, washed with water and with sodium bicarbonate solutions, then with water again, dried and the solvent removed under pressure. From the residue Compound XV was obtained by recrystallization from alcohol.

Hydrolysis and decarboxylation of Compound XV to give Compound XVI

To hydrolyze Compound XV, one heats it on the water bath with alcoholic potash, then pours into cold water and extracts the mixture with ether. From the ethereal extract one obtains a carboxylic acid which loses carbon dioxide when heated to form Compound XVI. To form Compound I from Compound XVI, one heats the latter with constant boiling hydriodic acid, separates the products and purifies the keto alcohol.

I claim:

1. Process which comprises the step of halogenating 2-methyl-2-carboethoxy-cyclohexanone-1 to the corresponding 6-halogen derivative and replacing the 6-halogen of said derivative by a group having the formula —O—R, in which R is a member of the group consisting of alkyl and aryl.

2. Process which comprises reacting a compound of the formula

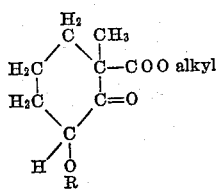

in which R stands for a member of the group consisting of alkyl and aryl with a β-halogeno ethyl propionate in the presence of magnesium and successively dehydrating and hydrogenating the product.

3. Process which comprises the step of reacting a compound of the formula

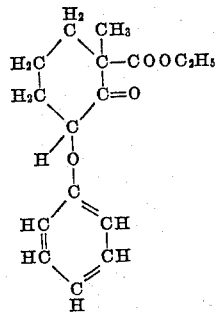

with an ethyl halogen acetate, successively dehydrating, hydrogenating and hydrolyzing the resulting 1-hydroxy-2-methyl-2-carboethoxy-6-phenoxy cyclohexanone-1-ethylacetate, converting the product of these successive operations into the acid chloride thereof, reacting said acid chloride with diazomethane, and reacting the resulting product with silver oxide, and esterifying the product of the silver oxide reaction.

4. Process which comprises cyclizing 2-methyl-2-carboethoxy-6-phenoxy cyclohexanone-1-ethyl propionate by heating in the presence of metallic sodium, hydrolyzing the cyclized product and decarboxylating the hydrolyzed product.

5. Process for the production of a compound of the formula

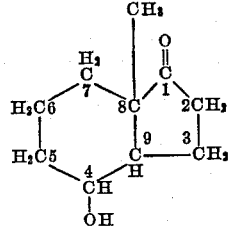

which comprises halogenating 2-methyl-2-carboethoxy cyclohexanone-1, reacting the product of the preceding step with a metallo compound of the formula MeOR, in which Me stands for a metal or metallo group and R stands for a member of the group consisting of alkyl and aryl, reacting the product of the preceding step with a β-halogeno propionate, dehydrating the product of the preceding step, hydrogenating the product of the preceding step, esterifying the product of the preceding step, cyclizing the product of the preceding step, saponifying the product of the preceding step, decarboxylating the product of the preceding step, and hydrolyzing the ether of the preceding step.

6. Process for the production of a compound of the formula

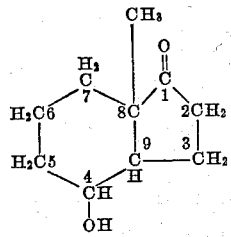

which comprises halogenating 2-methyl-2-carboethoxy cyclohexanone-1, reacting the product of the preceding step with a metallo compound of the formula MeOR, in which Me stands for a metal or metallo group and R stands for a member of the group consisting of alkyl and aryl, reacting the product of the preceding step with ethyl-bromo acetate, dehydrating the product of the preceding step, hydrogenating the product of the preceding step, hydrolyzing the product of the preceding step, converting the product of the preceding step into the acid chloride thereof, reacting said acid chloride with diazo methane, reacting the product of the preceding step with silver oxide, esterifying the product of the preceding step to the diester thereof, cyclizing said diester, saponifying the product of the preceding step, decarboxylating the product of the preceding step, and hydrolyzing the product of the preceding step.

7. A compound of the formula

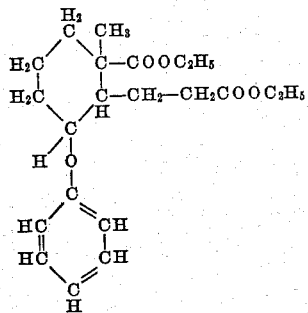

8. A compound of the formula

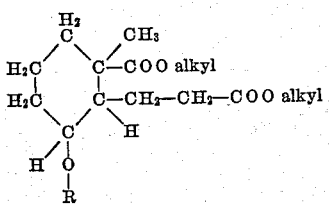

in which R stands for a member of the group consisting of alkyl and aryl groups.

NICHOLAS A. MILAS.